United States Patent [19]

Rose

[11] Patent Number: 4,585,245

[45] Date of Patent: Apr. 29, 1986

[54] FRONT FORK SHOCK SLIDER FOR MOTORCYCLES AND THE LIKE

[76] Inventor: Richard Rose, 25622 Darmouth Cir., El Toro, Calif. 92630

[21] Appl. No.: 633,052

[22] Filed: Jul. 20, 1984

[51] Int. Cl.<sup>4</sup> ............................................. B62K 25/04
[52] U.S. Cl. ...................................... 280/277; 280/286
[58] Field of Search ............... 280/277, 276, 285, 286; 403/290

[56] References Cited

U.S. PATENT DOCUMENTS

| | | | |
|---|---|---|---|
| 638,723 | 12/1899 | Kelly | 280/277 |
| 973,071 | 10/1910 | Redmond | 280/285 X |
| 1,379,784 | 5/1921 | Schwartz | 403/290 |
| 1,475,044 | 11/1923 | Bloom | 280/286 |
| 1,517,146 | 11/1924 | Bloom | 280/286 |
| 4,327,928 | 5/1982 | Chalmers | 280/277 |

Primary Examiner—John A. Pekar
Attorney, Agent, or Firm—Ben E. Lofstedt

[57] ABSTRACT

A shock absorbing mechanism for wheels for absorbing horizontally-applied shock loads experienced by the wheel whereupon the axle and hub of the wheel are permitted to move rearwardly, or "slide", upon the application of a relatively substantial horizontal shock force. The spring rate, stiffness and travel are all adjustable. Means are provided for anchoring the stationary portion of the wheel braking mechanism to a stationary portion of the motorcycle and, should it be desired to do so, for bypassing the shock absorbing mechanism of the present invention to restore the axle and wheel combination to the former function non-shock absorbing relationship.

7 Claims, 4 Drawing Figures

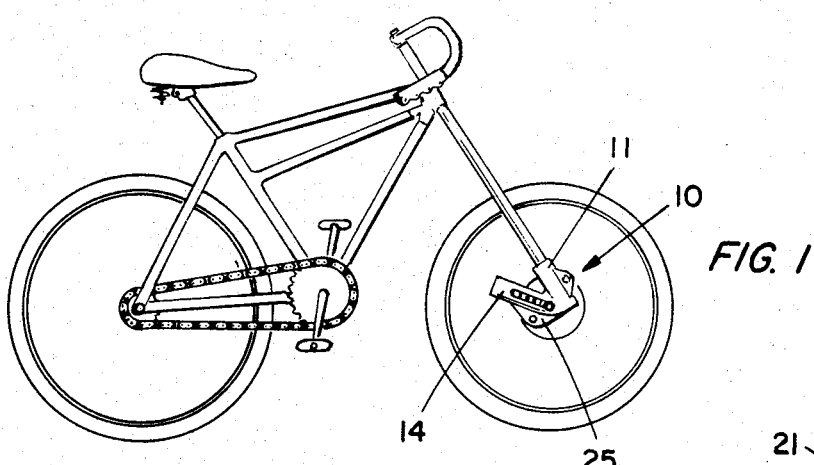
FIG. 1
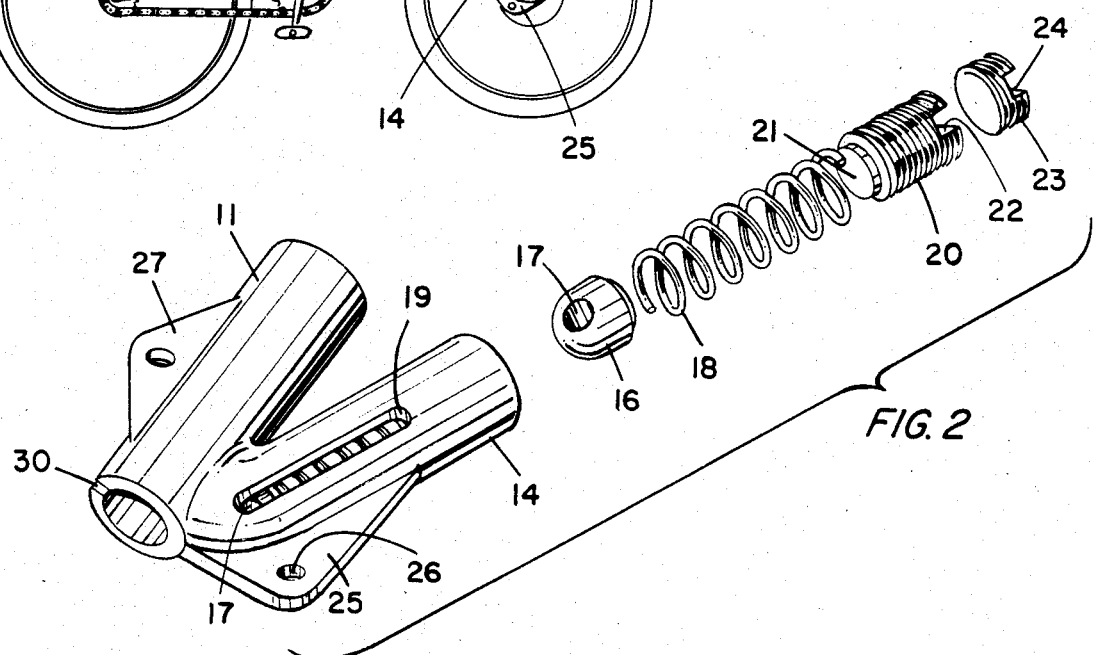
FIG. 2
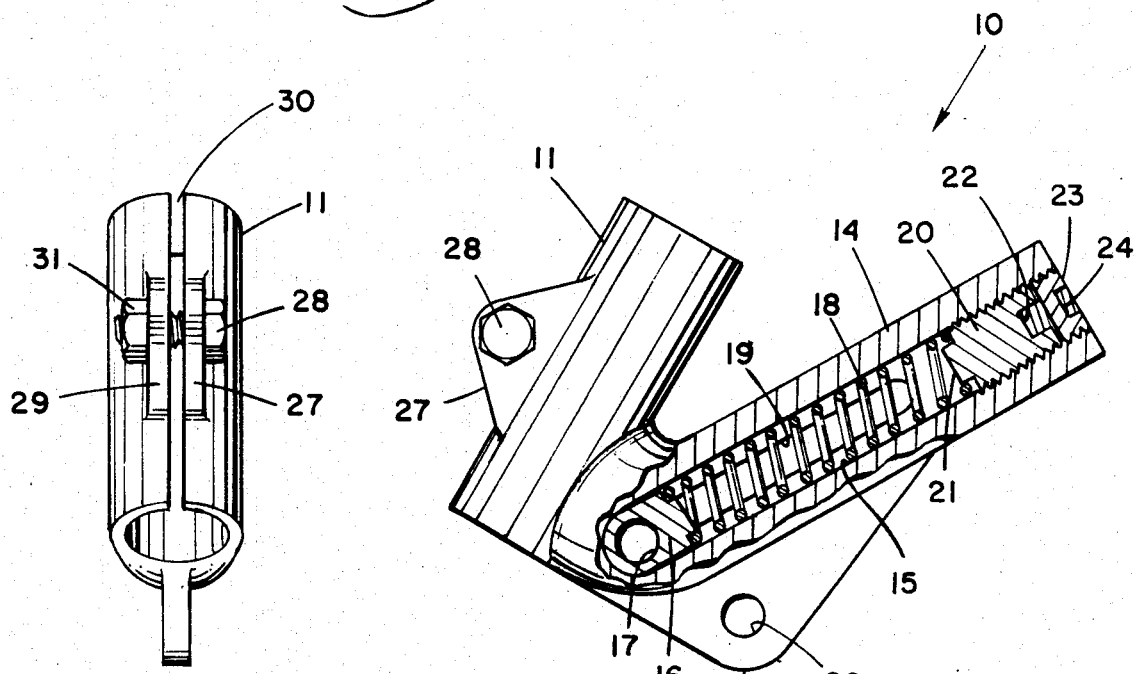
FIG. 3
FIG. 4

FRONT FORK SHOCK SLIDER FOR MOTORCYCLES AND THE LIKE

BACKGROUND OF THE INVENTION

1. Field of the Invention

The instant invention resides in the field of shocks for motorcycles and the like, and, more particularly, to front shock and axle sliders for motorcycles.

2. Description of the Prior Art

The basic function of the front fork shock and slider typified by the present invention is to permit the absorption of near-vertical loading experienced by the front tire and rim of a motorcycle, or the like, during its operation and to permit limited rearward movement of the front wheel axle when it experiences excessive near horizontal, rearward loading during operation. Means are provided for anchoring the stationary portion of the wheel braking mechanism to a stationary portion of the motorcycle and, should it be desired to do so, for by-passing the shock absorbing mechanism of the present invention to restore the axle and wheel combination to the former function non-shock absorbing relationship.

The state-of-the-art in this area of activity as known by the inventor herein are:

British Pat. No. 606,617
U.S. Pat. No. 836,040
U.S. Pat. No. 963,993
U.S. Pat. No. 1,715,246
U.S. Pat. No. 2,649,312
U.S. Pat. No. 2,729,465
U.S. Pat. No. 2,752,168
U.S. Pat. No. 4,037,855
U.S. Pat. No. 4,327.928

British Pat. No. 606,617 relates to a pivotal wheel axle mounted on the front shocks of a motorcycle. Basically, this prior art device is a pivotal wheel axle mounted on the front shocks of a motorcycle. However, its movement is constrained to move in an up and down motion and cannot slide rearwardly or forwardly as is clearly provided by the device disclosed in the present application.

U.S. Pat. No. 836,040 relates to a cushionary device for the front wheel. It is enclosed to prevent dust and dirt from interfering with the action of the springs housed therein. It is constrained to move in a vertical direction only.

U.S. Pat. No. 963,993 relates to a spring fork for bicycles. As illustrated in the drawings, FIG. 1 reveals spring forks at 4 and 5 which are secured to a wheel hub mechanism identified at 8 and 16. As can be clearly seen, the forks 4 and 5 which hold the wheel hub 16 are formed of spring steel and provide the necessary springiness to absorb the shocks incurred in the tranversing of the roadway.

U.S. Pat. No. 1,715,246 relates to a frame for motorcycle vehicles. The spring mechanism included herein is arranged to provide vertical motion alone.

U.S. Pat. No. 2,649,312 relates to a fork attachment for providing a shock absorbing system for bicycle wheels. It does not incorporate a moving pivot, hub axle arrangement for the front wheel as present by the applicant's device presented herein.

U.S. Pat. No. 2,729,465 relates to a springing system for a motorcycle wheel. A radically wound spring is mounted in the end of the forks upon which wheels are supported. A pivot arm 4 is secured at one end to the wheel axle and at the opposite end to the spring. The net result is that both vertical motion and rearward motion of the wheel is permitted while shocks are absorbed.

U.S. Pat. No. 2,752,168 relates to a front wheel suspension for motorcycles. This device provides vertical and rearward wheel axle motion. The spring 5 is inside of the front fork and is coupled to an arm 1 by means of an extension 2.

U.S. Pat. No. 4,037,855 relates to a bicycle with a shock absorbing front end. As clearly shown in FIG. 2, the mechanism is formed as part of the steering mechanism, and not a part of the wheel and hub as disclosed by the new invention herein.

U.S. Pat. No. 4,327,928 relates to a motorcycle fork structure with an internal shock-absorbing system. It does not teach the use of a shock absorbing wheel-hub such as envisioned by the present invention disclosed herein.

SUMMARY OF THE INVENTION AND OBJECTS

Fundamentally, the present invention disclosed herein is a shock absorbing device which is adapted to be attached to a wheel via the hub and axle thereof. Its purpose is to allow motorcyles and moto-cross-type bicycles to absorb horizontal wheel impact forces for a sufficient period of time to allow tthe wheeel to roll over the relatively large object in its path which produced the horizontal force or to allow the vehicle rider to timely and safely disengage himself from the motorcycle or bicycle to avoid injury.

Mechanically, the device consists of a housing adapted to be secured about the front forks of a motorcycle, or the like, clamping means for adjustably securing the housing to the forks, a rearwardly projecting tubular housing portion having a slot therein adapted to receive the wheel axle therein, an axle carrier adapted to receive the axle and disposed within the tubular housing for movement therein, a longitudinal spring mechanism for absorbing shock loads impressed upon the hub and axle of the wheel, the spring adapted to be disposed within the tubular housing portion, and a plug to close the open entrance to tubular portion of the housing to fully contain and capture the spring within the housing.

It is one object of the invention to provide a means for absorbing horizontal forces encountered by the wheels of either a motorcycle or a bicycle to improve the likelihood of the wheel rolling over the impacted object which caused the horizontal load to be applied to the wheel.

Another object of the invention is to provide a means for absorbing some or all of the horizontally applied or encountered forces experienced by the wheel to reduce impact shock to the motorcycle, or the like.

A yet still further object of the instant invention is to provide a means for delaying the impact force of a horizontally applied force to allow the rider of the motorcycle to make a decision as to whether or not to disengage himself from the motorcycle.

Another important object of the invention disclosed herein is to provide a means whereby the majority of a horizontally applied force experienced by a wheel and wheel hub and axle combination will be diverted from the front forks of a motorcycle thereby reducing the likelihood of flipping the rider over the front forks and injuring him. None of the prior art devices known to the inventor provide a means for operably bypassing the shock absorbing function in the event that the shock-absorbing spring breaks or there is some other malfunction of the shock-absorbing mechanism. Such a means is provided in the within invention disclosed by the applicant herein.

Other objects, features and characteristics of the invention will become more apparent as the description proceeds in connection with the accompanying drawings of which:

BRIEF DESCRIPTION OF THE DRAWINGS

FIG. 1 is a side elevational view showing the invention attached to the front forks of a bicycle.

FIG. 2 is an exploded assembly view of the present invention disclosed herein, with a portion of the invention shown in its assembled configuration.

FIG. 3 is a front elevational view of the present invention.

FIG. 4 is a side elevational view of the invention shown in its assembled form shown partially in section.

DESCRIPTION OF THE PREFERRED EMBODIMENTS

With continued reference to the drawings herein, and with special emphasis now on FIG. 4, there is generally shown at 10, the present invention, which may be referred to as a front fork shock slider for motorcycles and the like. The slider 10 consists of a housing which includes two tubular portions 11, 14. The first tubular portion 11 is adapted to be removably secured to the ends of the front forks of a bicycle or motorcycle as shown specifically in FIG. 1. The second tubular portion 14 serves as a housing for the shock absorbing mechanism. The shock absorbing mechanism includes a moveable sliding body 16 with a passageway 17 therein adapted to receive the axle of the wheel hub of the front wheel of the bicycle or motorcycle. One end of the sliding body 16 is characterized by a blunted, radiused nose which acts a self-locating nose with respect to the inside, closed end section of the second tubular portion 14. The inside end section being conformably complementary in shape to the nose of the body 16. The other end of the body 16 is undercut about its periphery to locate the end of the shock absorbing spring 18. The other and open end of the second tubular portion 15 is threaded about the inside portion thereof in order to threadably receive and secure a spring retaining plug 20 and a locking plug 23 for the spring retaining plug 20.

With reference now specifically to FIG. 2, there is shown and illustrated an exploded assembly view of the present invention. Liberty is also taken by detailing in the instant view, the invention in its assembled condition within the housing in the same Figure.

Referring now to FIG. 1, the invention 10 is shown installed in place on the front wheel forks. As can be clearly shown, the housing is secured via the first tubular portion 11 to the ends of a pair of bicycle forks. The second tubular portion 14 of the housing is disposed rearwardly of the fork ends and the front wheel axle is mounted through the passageway 17 of the movable sliding body 16 and through the pair of oppositely-disposed slots 19 arranged longitudinally in the second tubular portion 14 of the housing.

Turning now to FIG. 3, the first tubular portion 11 of the housing is shown with the clamping or locking means for securing the invention 10 to the ends of the pair of bicycle forks. At this time it should be clearly noted that two (2) of the subject inventions are required for use on each wheel. The first tubular portion 11 of the housing of the invention 10 is positioned over and about the end of one of the bicycle forks. After positioning and aligning the second tubular portion 14 rearwardly, the bolt 28 and nut 31 are matingly passed through the pair of holes in the cast gussets 27, 29 formed as an integral part of the housing and thereafterwards threadably engaged to firmly and securely clamp the first tubular portion 11 to and about the bicycle fork. As the nut 31 and bolt 28 are further engaged to clamp the housing to the fork, the gap 30 narrows to allow the cast gussets to move into closer mutual relationship with one another. The net effect is to permit a substantial amount of clamping and frictional engagement between the first tubular portion 11 and the bicycle fork.

Following the clamping and securing of the first tubular portion 11 of the housing to the front fork and with special reference now to FIG. 4, the invention 10 can be clearly shown in its assembled condition ready to be used. The axle (not shown) of the bicycle is passed through the hole 17 in the movable sliding body 16 which is disposed at the innermost portion of the second tubular body portion 14. The spring 18 is then positioned within the second tubular portion 14 and the end of the spring 18 is nestingly engaged about the undercut portion of the sliding body 16 and the inside sidewall of the second tubular body portion 14. The spring 18 is then compressed into the second tubular body 14 and the spring retainer plug 20 is threadably engaged with the mating threaded portion of the extremity of the second tubular portion 14. A slotted portion 22 is provided in the plug 20 as a convenient means for engaging a screwdriver blade to effectuate easy removal and installation of the spring 18 within the second tubular body 14. A threaded locking plug 23 is then installed by similar means using a screwdriver blade to engage the slot 24 in the top of the locking plug 23. The locking plug 23 prevents and ensures that the plug 20 does not disengage under vibration or use by preloading the mating threaded engagement of the plug 20 within the second tubular portion 14. With reference now additionally to FIGS. 2 and 4 of the Drawings herein, there is further shown and described a reinforcing flange 25 with an aperture 26 therein. The purpose and function of the flange 25 is to provide additional reinforcement and strength to the typically cast metal part identified herein as the second tubular portion 14. The aperture 26 provides a convenient means for operably mounting and securing the brake hub anchor of the stationary portion of the brakes. Alternatively, the aperture 26 may be used as a means for operably mounting and securing the axle of the front wheel of the bicycle or motorcycle to which the invention 10 is to be attached, which if so accomplished, entirely bypasses the slider action of the invention described herein and restores the front bicycle wheel to its former action, that is, a non-slider action. Such action is identical to the front wheel action without the invention herein attached thereto.

It should be perfectly clear that this invention is capable to other embodiments without departing from the spirit and scope of the invention. For example, the spring 18 could be readily replaced with a hydraulic double-acting shock absorbing mechanism and function in much the same way. Therefore, I do not intend to limit either the spirit or scope of the invention to the present embodiment shown and illustrated herein, but this invention should only be limited by the meets and bounds of the claims appended hereto.

What is claimed is:

1. A shock absorbing mechanism for bicycle wheels and the like for absorbing horizontally-applied shock loads experienced by the wheel whereupon the axle and hub of the wheel are permitted to move rearwardly, or "slide", comprising:
   (a) a housing including a first and a second tubular portion, the first tubular portion being adapted to be removably secured about the end of one of a pair of forks supporting an axle for the wheel, and the second tubular portion projecting rearwardly from said first tubular portion and having a pair of laterally and oppositely-disposed slots therein and a threaded portion about the inside of the rearwardmost portion thereof;
   (b) clamping means for securing said first tubular portion of said housing to one of the forks of the bicycle;
   (c) an axle-carrying insert adapted to be slideably disposed within the second tubular body with an aperture therethrough for freely receiving the wheel axle therethrough;
   (d) a spring adapted to be operably arranged within the second tubular portion in operable engagement with the rear end of the insert;
   (e) a spring retainer plug, said plug having a threaded portion thereabout operably mateable to the internal threaded portion of said second tubular portion to retain the spring within said second tubular portion; and
   (f) a first flange member depending from said second tubular portion of said housing, said first flange member having an aperture therein for anchoring the stationary portion of the brakes for the wheel.

2. The apparatus of claim 1, further comprising a locking plug, said locking plug having a threaded portion thereabout adapted to be threadably engageable with the internal threaded portion of said second tubular portion, said locking plug serving to preload the threaded portion of said spring retainer plug with respect to the internal threaded portion of said second tubular portion to prevent said spring retainer plug from becoming disengagecd while in operation.

3. The apparatus of claim 1 wherein said clamping means comprises:
   (a) a portion of said first tubular portion of said housing having a longitudinal gap therealong running the length of said first tubular portion;
   (b) a first gusset projecting outwardly from said first tubular section and having an aperture therein;
   (c) a second gusset projecting outwardly from said first tubular section, said second gusset being oppositely disposed in complementary relationship to said first gusset and on the side of the first tubular portion on the other side of the gap therein, said second gusset having a aperture therein which is oppositely disposed in complementary alignable relationship to said aperture of said first gusset;
   (d) a bolt adapted to be passed through said apertures in said first and second gussets; and
   (e) a nut adapted to be mated to the free end of said bolt and adjusted to force the gussets into increasing closer relationship thereby clamping the body of the first tubular portion into intimate frictional engagement with the bicycle fork to secure it in fixed relationship thereto.

4. The apparatus of claim 1 wherein said axle-carrying insert has a radiused nose thereon.

5. The apparatus of claim 1 wherein said spring is a helically-wound, compressively-loaded spring.

6. The apparatus of claim 1, further comprising a means for operably bypassing the shock absorbing mechanism and for mounting the axle of the wheel in fixed relationship to the forks of the motorcycle.

7. The apparatus of claim 6, wherein said means for operably bypassing the shock absorbing mechanism and for mounting the axle of the wheel in fixed relationship to the forks of the motorcycle, comprising a second flange having an aperture therein, said second flange depending from the second tubular portion of the other housing element affixed to the other of said motorcycle forks for the wheel whereby the ends of the wheel axle are operably mounted in the apertures of the first and second flange members, said aperture in said first flange member being utilized for both anchoring the stationary portion of the brakes for the wheel and for mounting one end of the axle therein.

* * * * *